United States Patent [19]

Baumann

[11] Patent Number: 4,609,178

[45] Date of Patent: Sep. 2, 1986

[54] DIAPHRAGM TYPE CONTROL VALVE

[76] Inventor: Hans D. Baumann, 32 Pine St., Rye, N.H. 03870

[21] Appl. No.: 746,834

[22] Filed: Jun. 20, 1985

Related U.S. Application Data

[63] Continuation-in-part of Ser. No. 576,362, Feb. 2, 1984, Pat. No. 4,549,719.

[51] Int. Cl.⁴ .................. F16K 7/16; F16K 31/524
[52] U.S. Cl. ................... 251/229; 251/331; 251/251; 74/110; 74/516
[58] Field of Search ............... 251/331, 280, 244, 263, 251/229, 251; 74/110, 516

[56] References Cited

U.S. PATENT DOCUMENTS

| | | | |
|---|---|---|---|
| 1,125,856 | 1/1915 | Mara | 251/331 |
| 2,395,223 | 2/1946 | Ingress | 74/516 X |
| 3,078,066 | 2/1963 | Moore | 251/331 X |
| 4,014,514 | 3/1977 | Priese et al. | 251/331 |
| 4,265,141 | 5/1981 | Bowman | 74/516 |
| 4,270,398 | 2/1981 | Arnold | 74/110 |

FOREIGN PATENT DOCUMENTS 496700  6/1954  Italy .................................. 251/331

Primary Examiner—Arnold Rosenthal

[57] ABSTRACT

Diaphragm type control valve comprising an inert material coated and profiled diaphragm motivated against a shaped valve orifice by a mechanical amplifying mechanism following the command signal of an external controlling device and wherein the combination—profiled diaphragm and shaped valve orifice—is capable of forming an annular flow passage having a smooth entrance and a sharply expanding exit portion thereby reducing pressure recovery of the passing fluid to avoid cavitation.

5 Claims, 2 Drawing Figures

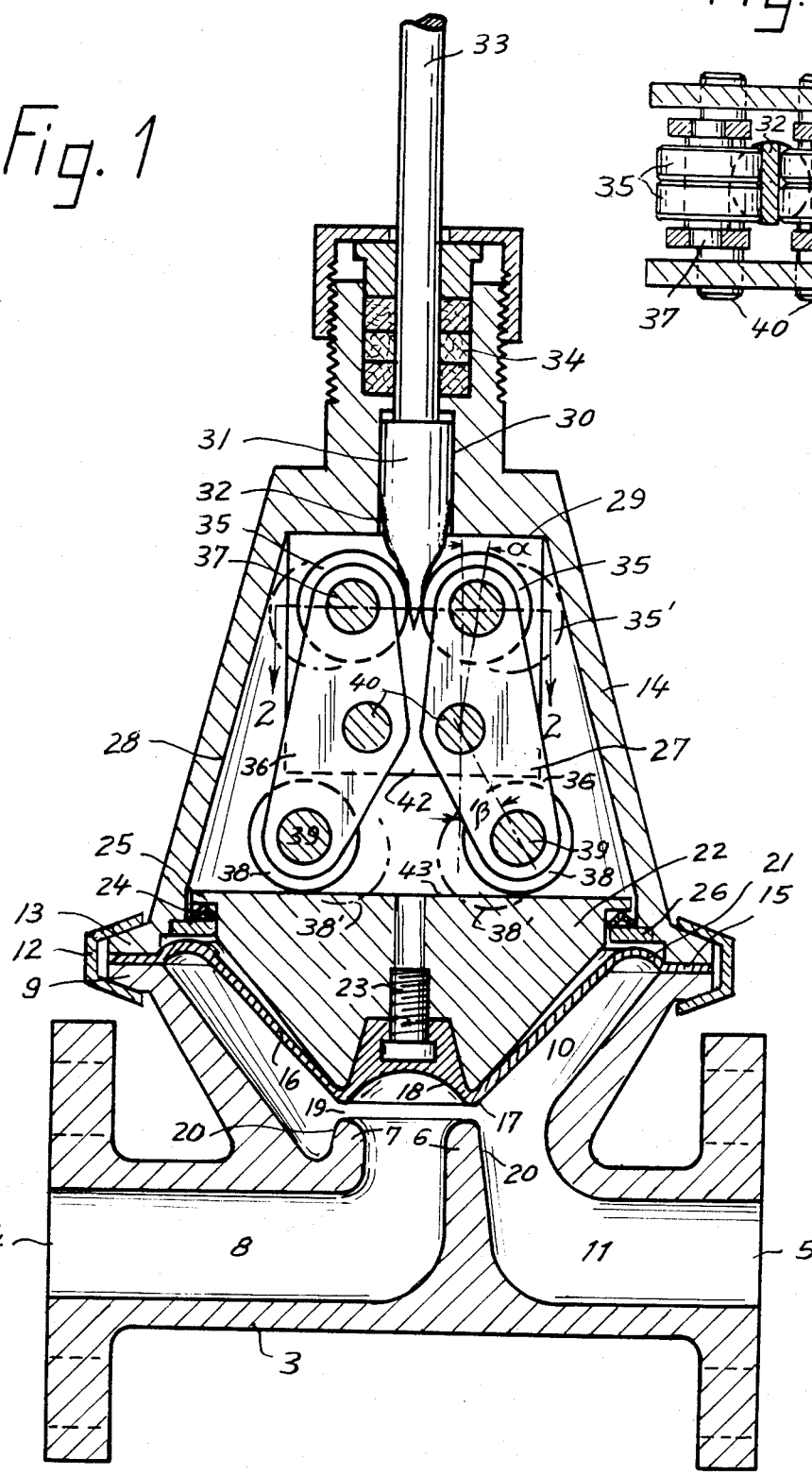
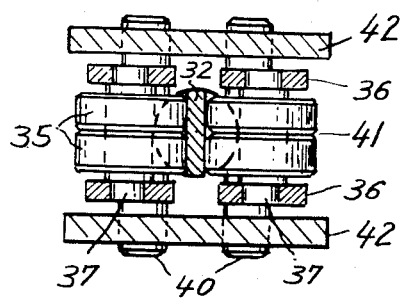

DIAPHRAGM TYPE CONTROL VALVE

BACKGROUND OF THE INVENTION

This is a continuation in-part of my co-pending U.S. patent application Ser. No. 06/576,362 filed on Feb. 2, 1984 now U.S. Pat. No. 4,549,719 dated Oct. 29, 1985.

This invention relates to control valves used to modulate and control the flow of fluids especially fluids having high slurry content, that are of high viscosity or those that need to be contained in a sanitary environment.

One of the prior art type of valves used for such applications are so-called "SAUNDERS" valves comprising a housing having one inlet and one outlet port separated by a weir like rib. A flexible elastomer diaphragm is pushed by suitable actuator means against the weir to provide shut-off. A somewhat modified version using an orifice instead of a weir is shown in U.S. Pat. No. 4,014,514.

While these so-called "SAUNDERS" valves do work reasonably well for on-off purposes, their use as throttling control valves is severely limited because:

(a) their actuator force requirements are very high since the actuator has to overcome a force composed of line pressure acting on a large diaphragm area;

(b) a very poor control characteristic i.e. relationship between flow and actuator travel. The characteristic obtained is a so-called "quick-open" which will pass most of the flow near the shut-off, less at higher diaphragm lifts. This is exactly opposite from a desired control characteristic;

(c) a high tendency to cavitate, or, for the diaphragm to wear under higher pressure drop conditions due to the fact, that fluid dynamic profiles of diaphragm and valve seat are very poor;

My invention overcomes all these and other objections to prior art by:

(1) providing a unique mechanical amplifying mechanism which drastically reduced the actuator force requirement mentioned above;

(2) the mechanical amplifying means additionally provides for a more gradual opening of the diaphragm as function of actuator travel. Such modified action can be further enhanced by the use of a profiled wedge as will be described later. As a result, a so-called "equal percentage" flow characteristic can be provided;

(3) the rounded entrance ways of both orifice and diaphragm coupled with a rapidly expanding area ratio exterior of the valve seat places the "Vena Contracta", or jet contraction, away from seat and diaphragm thereby preventing cavitation and wear damage on both valve seat and diaphragm.

These and other advantages may be better understood in view of the following annexed drawings, wherein:

FIG. 1 is a vertical, central, cross-sectional view of a preferred embodiment of my invention.

FIG. 2 is a horizontal cross-sectional view of the mechanical amplifying element which is part of FIG. 1 and following the line 2—2 in FIG. 1.

DETAILED DESCRIPTION

While the invention will be described in connection with a preferred embodiment, it will be understood that it is not intended to limit the invention to this specific embodiment.

Referring now to FIG. 1, my invention comprises a valve housing 3 having an inlet port 4 and an outlet port 5. A valve orifice 6 having a well rounded entrance section 7 communicates through passage 8 to the inlet port 4. Valve housing 3 terminates at an upper flanged portion 9 surrounding a tapered cavity 10 leading towards said valve orifice 6. An additional passage 11 communicates fluid between cavity 10 and outlet port 5.

The upper flange 9 of housing 3 is engaged by means of a tapered clamp 12 to a similar flange 13 which is part of a bonnet 14. A diaphragm 15 whose outer rim is clamped between the two flanged portions 9 and 13 has a frustum shaped cross-sectional profile 16 extending downwards towards orifice 6 and terminating in a smaller diameter portion 17 which is capable of sealingly engaging the outer extremities of radius 7. The lower diaphragm portion 17 has an additional concave portion 18 which, together with radius 7 of valve orifice 6, provides a very smooth entrance for fluid coming from passage 8. This smooth entrance leads into narrow restriction 19 after which the fluid is allowed to expand drastically into cavity 10. In order to avoid that the jet, after expanding from the annular area 19, contacts either the diaphragm surface or any surface of housing 3, I have arranged in my invention to immediately retract diaphragm 15 at an angle of approximately 45° from any imaginary flow line perpendicular to annular area 19 and to have body surface 20 retract nearly 90° from the same imaginary line. This will prevent the high turbulence associated with the throttling process from either contacting or damaging either the diaphragm or the housing surfaces.

A phenomena called "Pressure Recovery" is therefore avoided making this valve also less susceptible to cavitation.

A curved portion 21, located near the top portion of diaphragm 15, provides excess material so that diaphragm 15 may be moved by a plunger 22 towards orifice 6 for tight closure of passage 19 without necessitating stretching of diaphragm 15 and thereby, the possibility of destroying a sometimes desired teflon or plastic coating of diaphragm 15.

Finally, the lower central portion of diaphragm 15 can be provided with a mold-in bolt 23 threadingly retained in plunger 22 to prevent disengagement of diaphragm 15 from plunger 22 in case of vacuum in cavity 10.

Plunger 22 and therefore, diaphragm 15 are normally pulled up from orifice 6 by a wave spring 24 which is interspaced between a flanged portion 25 of plunger 22 and a retaining ring 26 located in bonnet 14.

A mechanical amplifying means 27, also shown in FIG. 2, is retained within a central opening 28 of bonnet 14. This opening 28 terminates in a horizontal shoulder 29 having a reduced diameter portion 30. A slidable stem 31 is retained within the reduced diameter portion 30 and has a contoured, wedgelike extension 32. The slidable stem 31 is further connected at its upper reduced portion 33 to a valve actuating device of conventional construction (not shown) so that it may be moved up and down following the command signals of an external controlling device.

A conventional valve packing 34 will prevent escape of fluid past stem 33 should diaphragm 15 be pierced due to over-pressure or other mishaps.

Referring again to the wedgelike lower extension 32 of stem 31 in its retracted position, as shown in FIG. 1, only a narrow portion is in contact with a pair of upper ball bearings 35. Two sets of opposed ball bearings 35 are fastened to pairs of opposed parallel linkages 36 by pins 37. Another set of ball bearings 38 are similarly engaged at the lower portion of linkages 36 by pins 39. The two opposed sets of linkages 36 are pivotably arranged and supported by shafts 40 thus forming, together with the ball bearings, two separate toggle elements 41. Shafts 40 in turn are supported by two opposed, parallel plates 42 whose upper terminating shoulders extend above the extremity of ball bearings 35 and engage tightly the horizontal shoulder 29 of opening 28.

Lower ball bearings 38 are in contact with the upper surface 43 of plunger 22 which is extended upward by the force of wave spring 24. Upon down movement of stem 31 by an actuating device of conventional design (not shown) and following the command signal of an exterior controlling device, a gradually widened portion of the lower extension 32 wedges between ball bearings 35 which, in turn, causes both toggle elements 41 to pivot and to move ball bearings 38 inwards towards the dashed position 38' in turn, pressing plunger 22 and thereby diaphragm 15 to extend towards valve orifice 6.

Since the geometry between centers for pins 37, 39 and shafts 40 is that of an obtuse triangle, the rate of change in motion of plunger 22 is a function of the change in tangens $\alpha$ and the change in cosine $\beta$. As a result of this relationship, rather high amplification ratio between the force of stem 31 and that of plunger 22 of up to 50:1 is possible. This is a very useful advantage considering the fact, that the reaction force caused by the fluid pressure acting on all of the exposed diaphragm area 16 can be considerable.

A further modification in this relationship can be obtained by greatly varying the wedge angle during the travel of stem 31, thereby causing a very rapid separation of bearings 35 near the upper position of plunger 22 (valve open). Near the lower position of plunger 22, with the valve having only a small opening, here a relatively small motion of diaphragm 16 is desired to finely control the fluid. The wedgelike contour 32 is therefore shaped to have only a very gradual change in wedge angle at this point, resulting in only a minor displacement of bearings 35 as function of movement of stem 31.

Typically, a characteristic yielding low flow increments near the closed position and high flow increments near wide open is called "equal percentage" and is commonly used for throttling valves.

Having thus described a typical embodiment of my invention, I hereby claim the following features of my invention:

1. Diaphragm Type Control Valve comprising:
   (a) a valve housing one inlet and one outlet port, a cavity extending towards the top of said valve housing, a valve orifice centrally located within said cavity, a passage connecting said cavity towards one of the ports, a second passage connecting the other port to said valve orifice, a flanged opening forming the upper terminating end of said valve housing, and extending above said valve orifice;
   (b) a flexible diaphragm suitably connected to said flanged opening capable of sealingly interacting with said valve orifice;
   (c) a valve bonnet having a central opening terminating in a lower flanged portion capable of connecting against said diaphragm, said central opening is further reduced in diameter near the top of the bonnet and retaining within a slidable stem;
   (d) a mechanical amplifying means retained within the central opening of said valve bonnet and capable of translating a larger vertical displacement of said slidable stem into a smaller vertical motion of said diaphragm and comprising one pair of identical toggle elements mounted in spaced relationship between a pair of opposed parallel outer plates whose upper terminating surfaces extend above the upper extremity of said pair of toggle elements and whose lower terminating surfaces are shortened in relationship to the lower extremity of said toggle elements, each of said toggle means pivotably supported by shaft means which are suitably retained within said pair of outer plates, each of said toggle elements comprising one or more upper bearings suitably supported above said shaft means and between a pair of opposed parallel inner plates, and one or more lower bearings suitably and rotably supported below said shaft means and between the same pair of inner plates whose outer periphery does not exceed that of the bearings, the geometric relationship between said upper bearing, said shaft means and said lower bearing is that of an obtuse triangle, and wherein said slidable stem is capable of sliding between said pair of outer plates and engaging and displacing said upper bearings and thereby pivoting said pair of toggle elements around said shaft means, said pivoting motion further causing said lower bearings to extend their co-sinusidal distance in respect to the supporting shaft means and thereby causing a downward motion of said lower bearings;
   (e) a plunger interspaced between said mechanical amplifying means and said diaphragm, said plunger being able to tansmit any displacement of said mechanical amplifying means on to said diaphragm.

2. Diaphragm type control valve according to claim 1, wherein said diaphragm has a frustum shaped profile expanding inwardly towards a smaller diameter portion at an angle of no less than 30° and no more than 50° to the vertical center of said diaphragm.

3. Diaphragm type control valve according to claim 2, wherein the smaller diameter portion of the frustum shaped diaphragm has a central concave indenture which is capable of guiding fluid entering from said valve orifice towards that portion of the lower diaphragm that is capable of sealingly interacting with said valve orifice.

4. Diaphragm type control valve according to claim 3, wherein said valve orifice has a well rounded profile extending rapidly outward from said second passage into a narrow, flat, horizontal rim capable of sealingly interacting with said diaphragm, said profile being capable together with said concave indenture of the diaphragm to gradually accelerate a fluid passing from said second passage and flowing rapidly outward towards and past said horizontal rim, said valve orifice further having an outer wall extending nearly vertically downwards exterior of said narrow, horizontal rim to allow for rapid disengagement of said fluid once passed said narrow rim.

5. Diaphragm type control valve as described in claim 1, wherein said slidable stem has a wedgelike extension capable of engaging between said pair of outer plates and displacing said upper bearings and wherein said wedgelike extension is shaped to cause a nonlinear relationship between the motion of the stem and the amount of displacement of the upper bearings.

* * * * *